(12) United States Patent
Racine et al.

(10) Patent No.: US 10,545,019 B2
(45) Date of Patent: Jan. 28, 2020

(54) CMM PROBE PATH CONTROLLER AND METHOD

(71) Applicant: Hexagon Metrology, Inc., North Kingstown, RI (US)

(72) Inventors: Paul Racine, Providence, RI (US); Scott Carlson, North Kingstown, RI (US)

(73) Assignee: Hexagon Metrology, Inc., North Kingstown, RI (US)

( * ) Notice: Subject to any disclaimer, the term of this patent is extended or adjusted under 35 U.S.C. 154(b) by 542 days.

(21) Appl. No.: 14/685,780

(22) Filed: Apr. 14, 2015

(65) Prior Publication Data

US 2016/0305777 A1    Oct. 20, 2016

(51) Int. Cl.
*G01B 21/00* (2006.01)

(52) U.S. Cl.
CPC .................... *G01B 21/00* (2013.01)

(58) Field of Classification Search
CPC ...... G01B 21/00; G01B 21/04; G01B 11/005; G01B 5/008; G05B 19/401
See application file for complete search history.

(56) References Cited

U.S. PATENT DOCUMENTS

| | | | | |
|---|---|---|---|---|
| 4,901,253 A * | 2/1990 | Iwano | ..................... | G01B 21/04 345/419 |
| 4,918,627 A | 4/1990 | Garcia et al. | .................. | 364/552 |
| 5,471,406 A | 11/1995 | Breyer et al. | .................. | 364/559 |
| 6,154,713 A * | 11/2000 | Peter | ...................... | G01B 21/04 33/504 |
| 8,336,219 B2 | 12/2012 | Grzesiak et al. | ............... | 33/502 |
| 8,825,438 B2 | 9/2014 | Anderson et al. | ............ | 702/150 |
| 2004/0109205 A1 | 6/2004 | Asano et al. | ................. | 358/448 |
| 2005/0086025 A1* | 4/2005 | Nomura | .................. | G01B 21/04 702/167 |
| 2008/0189969 A1* | 8/2008 | Fuchs | .................. | G01B 21/045 33/503 |
| 2009/0025463 A1 | 1/2009 | McFarland et al. | ............ | 73/104 |

(Continued)

FOREIGN PATENT DOCUMENTS

| | | |
|---|---|---|
| CN | 1277368 A | 12/2000 |
| CN | 1704718 A | 12/2005 |
| WO | WO 88/02845 A1 | 4/1988 ............. G01B 11/00 |

OTHER PUBLICATIONS

International Searching Authority, International Search Report—International Application No. PCT/US2016/021297, dated Jun. 17, 2016, together with the Written Opinion of the International Searching Authority, 12 pages.

*Primary Examiner* — Stephanie E Bloss
(74) *Attorney, Agent, or Firm* — Nutter McClennen & Fish LLP

(57) ABSTRACT

A method and apparatus for measuring an object using a CMM receives nominal geometry data relating to the object, and produces a set-up path based on the received nominal geometry data. The method also conducts a set-up measurement of the object using a CMM probe. The CMM probe conducts the set-up measurement by following the set-up path, and the set-up measurement of the object produces scan path information. The method generates a scan path using the scan path information, and controls the CMM probe to conduct a fine measurement of the object by causing the CMM probe to move along the generated scan path.

23 Claims, 5 Drawing Sheets

(56) References Cited

U.S. PATENT DOCUMENTS

| | | | |
|---|---|---|---|
| 2009/0138231 A1* | 5/2009 | Little | G01B 5/008 702/152 |
| 2009/0307916 A1 | 12/2009 | McLean et al. | |
| 2013/0185948 A1* | 7/2013 | Racine | G01B 5/008 33/503 |
| 2013/0283627 A1* | 10/2013 | Noda | G01B 21/04 33/503 |
| 2014/0215841 A1 | 8/2014 | Danbury et al. | 33/503 |
| 2014/0253724 A1* | 9/2014 | Yamagata | G01B 11/24 348/135 |
| 2015/0121710 A1* | 5/2015 | McMurtry | G01B 21/045 33/503 |

* cited by examiner

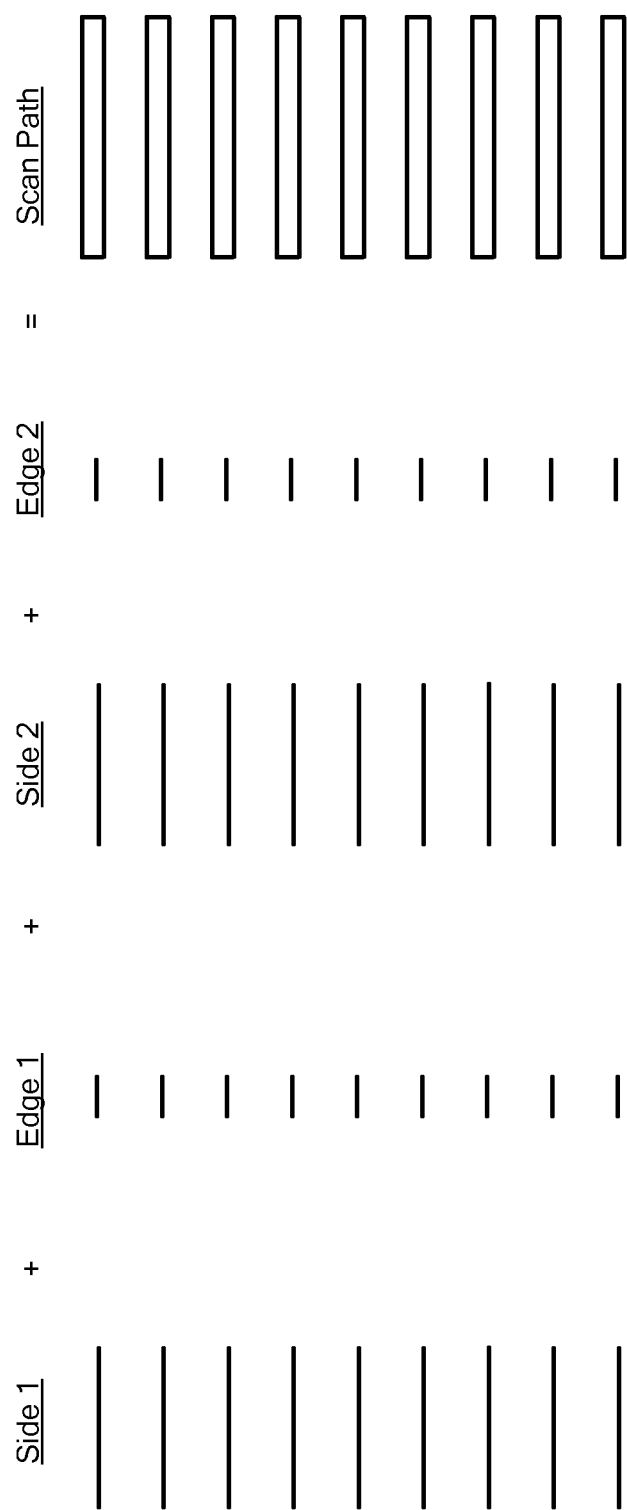

CMM PROBE PATH CONTROLLER AND METHOD

FIELD OF THE INVENTION

The invention generally relates to coordinate measuring machines and, more particularly, the invention relates to coordinating the movement of coordinate measuring machine probes to efficiently obtain measurement information about a physical object.

BACKGROUND OF THE INVENTION

Coordinate measuring machines (CMMs) are the gold standard for accurately measuring a wide variety of different types of physical objects/work pieces. For example, CMMs can measure critical dimensions of aircraft engine components (e.g., jet engine blades), surgical tools, and gun barrels. Precise and accurate measurements help ensure that their underlying systems, such as an aircraft in the case of aircraft components, operate as specified.

CMMs often quickly and efficiently measure objects having relatively simple geometries. For example, a CMM probe (i.e., the part of the CMM directly gathering the measurement data) typically can move relatively quickly around the outside surface of a uniform diameter gun barrel to gather the desired information. In such a case, the time to measure the gun barrel can be much less than the time to produce the gun barrel.

Objects with more complex geometries, however, can present a problem. For example, a jet engine blade often has an unusually complex geometry that complicates measurement. In that case, to ensure accurate measurements, the CMM probe often very slowly traverses about the blade. Undesirably, in some instances, the required time to measure a geometrically complex object can be unduly long; sometimes much longer than the time to manufacture the object itself. For example, the measurement time for objects having complex geometries may be three to five times longer than the manufacturing time.

SUMMARY OF VARIOUS EMBODIMENTS

In accordance with one embodiment of the invention, a method and apparatus for measuring an object using a CMM receives nominal geometry data relating to the object, and produces a set-up path based on the received nominal geometry data. The method then conducts a set-up measurement of the object using a CMM probe. The CMM probe conducts the set-up measurement by following the set-up path, and the set-up measurement of the object produces scan path information. The method generates a scan path using the scan path information, and controls the CMM probe to conduct a fine measurement of the object by causing the CMM probe to move along the learned generated scan path.

Among other things, the CMM probe may include a contact probe or, alternatively, a non-contact probe having a focal length. If the CMM probe is a non-contact probe, then the set-up path may direct the CMM probe along the object to move beyond its focal length (reducing accuracy) at least once when it moves along the object. The scan path preferably includes at least one revolution around the object. For example, the scan path can include a plurality of revolutions around the object, where the CMM probe conducts at least one fine measurement of the object during each revolution. In other embodiments, however, the scan path includes less than one revolution around the object.

The CMM probe preferably moves between at least two adjacent scan path revolutions without the CMM probe conducting at least one fine measurement of the object. As an example, the CMM probe may conduct a fine measurement along a first complete revolution, stop conducting fine measurements when it completes the first revolution, move to a second revolution that is spaced from the first revolution, and then begin taking fine measurements again as it begins and completes the second revolution.

The set-up path simply may include four substantially straight passes along the object. For example, the set-up path may include a plurality of revolutions around the object, where the CMM probe does not conduct a set-up measurement between adjacent revolutions.

In illustrative embodiments, the set-up measurement includes actual geometry data relating to the object. For example, the set-up measurement may have a first accuracy, and the fine measurement of the object may have a second accuracy that is higher than the first accuracy. Moreover, the CMM probe may generate a light beam having a longitudinal axis. To ensure accuracy, the scan path may be produced to orient the CMM probe so that the longitudinal axis of the light beam is substantially normal to the surface of the object during a majority of the scan path.

The fine measurement may have any of a variety of resolutions—typically finer than that during the set-up measurement. Thus, the fine measurement should produce more accurate metrological results. Among other things, the fine measurement simply may include a one-dimensional measurement along at least a portion of the object. In other embodiments, the fine measurement includes a two-dimensional or three-dimensional measurement along at least one portion of the object.

In accordance with other embodiments, a CMM includes a base configured to support an object, a CMM probe, and a control system operatively coupled with the CMM probe. The control system is configured to cause the CMM probe to conduct a set-up measurement of the object, where the CMM probe conducts the set-up measurement by following a set-up path that is based on nominal geometry data of the object. The set-up measurement of the object produces scan path information. The control system further is configured to generate a scan path using the scan path information, and control the CMM probe to conduct a fine measurement of the object by causing the CMM probe to move along the generated scan path.

Illustrative embodiments of the invention are implemented as a computer program product having a computer usable medium with computer readable program code thereon. The computer readable code may be read and utilized by a computer system in accordance with conventional processes.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

FIG. 4 pictorially shows how a path controller in a CMM combines data gathered during a first set-up scan into a final scan path in accordance with illustrative embodiments of the invention.

DESCRIPTION OF ILLUSTRATIVE EMBODIMENTS

In illustrative embodiments, a coordinate measuring machine ("CMM") conducts an initial, relatively coarse scan of a physical object to gather data that subsequently is used to form a more accurate scan path. More specifically, the CMM processes the gathered data to form a more accurate scan path to subsequently scan/measure the object. Accordingly, during its measurement scan, the CMM can traverse along the prescribed scan path at a more rapid rate because it does not have to form the scan path on the fly as it moves along the object. This should increase measurement throughput, effectively enabling more rapid object production. Details of illustrative embodiments are discussed below.

Figure 1A:
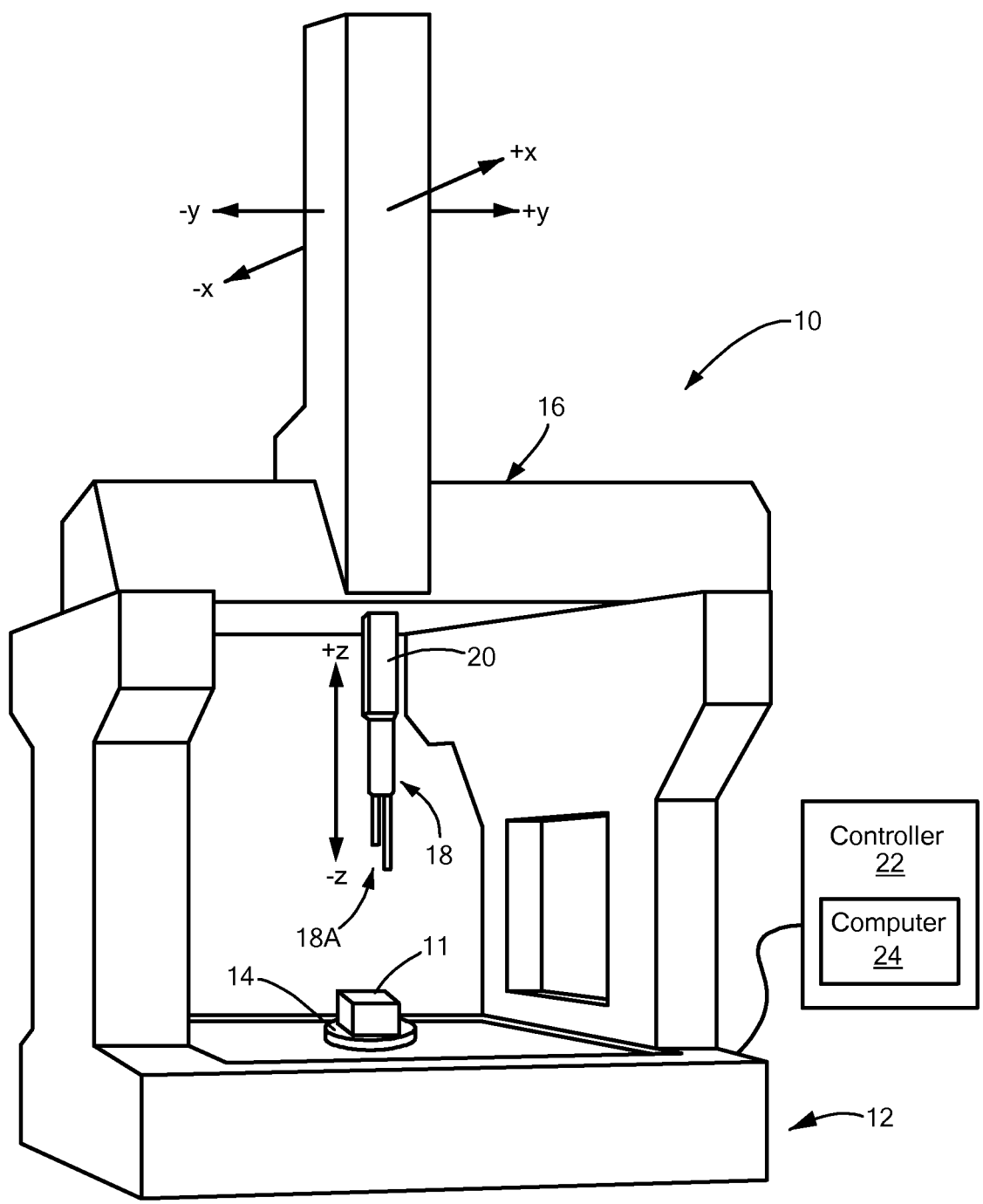
FIG. 1A schematically shows a coordinate measuring machine (CMM) configured in accordance with illustrative embodiments of the invention.

FIG. 1A schematically shows of one type of coordinate measurement machine 10 (i.e., a CMM system, referred to below as "CMM 10") that may be configured in accordance with illustrative embodiments. Indeed, this CMM 10 is but one of a number of different types of CMMs that may implement various embodiments. Accordingly, such a CMM is not intended to limit all embodiments.

As known by those in the art, the CMM 10, measures an object 11 (or workpiece) on its bed/ base (referred to as "base 12"), which may be formed from granite or other material. Generally, the base 12 defines an X-Y plane that typically is parallel to the plane of the floor supporting the CMM 10. In illustrative embodiments, the base 12 supports a rotary table 14 that controllably rotates the object 11 relative to the base 12 (discussed below).

To measure the object 11, the CMM 10 has movable features 16 arranged to move a measuring device 18, such as a probe 18A (e.g., one or more contact or non-contact probes, identified as reference number 18A), coupled with a movable arm 20. Alternately, some embodiments move the base 12 with respect to a stationary measuring device 18. Either way, the movable features 16 of the CMM 10 manipulate the relative positions of the measuring device 18 and the object 11 to obtain the desired measurement.

The CMM 10 has a control system 22 that controls and coordinates its movements and activities (shown schematically in FIG. 1A as "Controller 22"), which may be internal to the CMM 10, external to the CMM 10, or have both internal and external components. Among other things, the control system 22 preferably includes hardware, such as dedicated hardware systems and/or computer processor hardware. Among other things, the computer processor may include a microprocessor, such as a member of the Intel "Core 2" family of integrated circuit microprocessors available from Intel Corporation, or a digital signal processer, such as a member of the TMS320C66x family of digital signal processor integrated circuits from Texas Instruments Incorporated. The computer processor has on-board digital memory for storing data and/or computer code, including instructions for implementing some or all of the control system operations and methods. Alternately, or in addition, the computer processor may be operably coupled to other digital memory, such as RAM or ROM, or a programmable memory circuit for storing such computer code and/or control data.

Alternately, or in addition, some embodiments couple the CMM 10 with an external computer system 24 ("host computer 24"). Although FIG. 1A shows the computer system 24 as part of the control system, those skilled in the art should understand that it may be separate from the control system 22. In a manner similar to the control system 22, the host computer 24 has a computer processor such as those described above, and computer memory in communication with the processor of the CMM 10. The memory is configured to hold non-transient computer instructions capable of being executed by its processor, and/or to store non-transient data, such as 1) scan path data used to guide the measuring device 18 during a measurement scan, and/or 2) data acquired as a result of the measurements of an object 11 on the base 12.

Among other things, the host computer system 24 may be implemented as one or both of a desktop computer, a tower computer, or a laptop computer, such as those available from Dell Inc., or even a tablet computer, such as the iPad available from Apple Inc. The host computer 24 may be coupled to the CMM 10 via a hardwired connection, such as an Ethernet cable, or via a wireless link, such as a Bluetooth link or a WiFi link. As part of the control system 22, the host computer 24 may, for example, include software to control the CMM 10 during use or calibration, and/or may include software configured to process data acquired during a calibration process. In addition, the host computer 24 may include a user interface configured to allow a user to manually or automatically operate the CMM 10.

Because their relative positions typically are determined by the action of the movable features 16, the CMM 10 may be considered as having knowledge about the relative locations of the base 12, the rotary table 14, the object 11 on the rotary table, and the measuring device 18. More particularly, the control system 22 and/or computer system 24 may control and store information about the motion of the movable features 16. Alternately, or in addition, the movable features 16 of some embodiments include sensors that sense the locations of the base 12 and/or measuring device 18, and report that data to the control system 22 and/or the computer system 24. The information about the motion and position of the base 12 and/or measuring device 18 of the CMM 10 may be recorded in terms of a one dimensional, two-dimensional (e.g., X-Y; X-Z; Y-Z) or three-dimensional (X-Y-Z) coordinate system referenced to a point on the CMM 10.

Figure 1B:
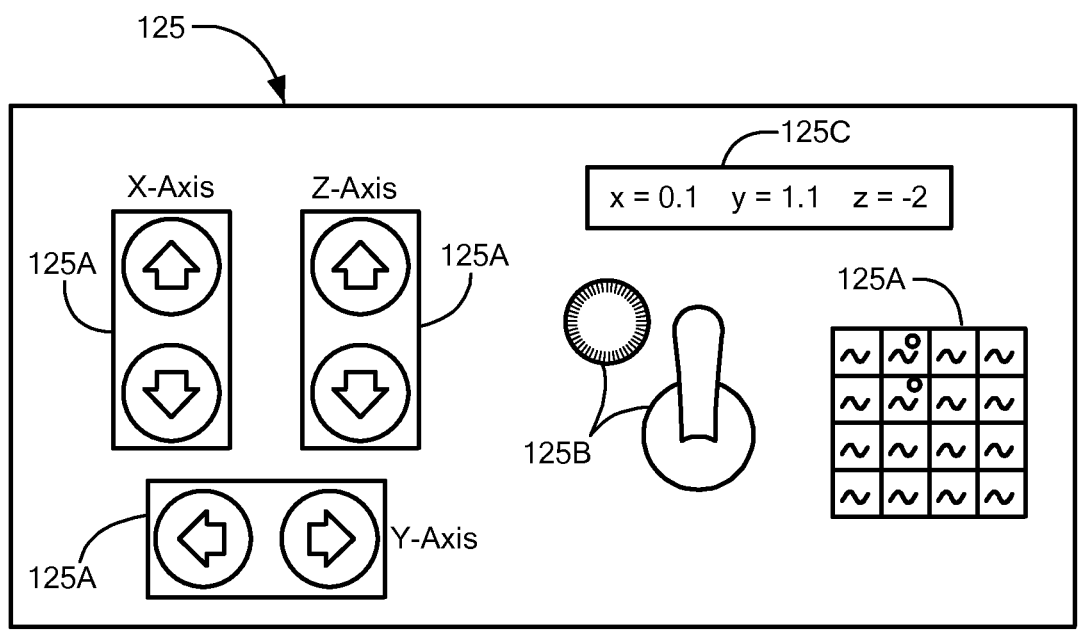
FIG. 1B schematically shows a user interface that may be used with the CMM of FIG. 1A.

Some CMMs also include a manual user interface 125 as schematically illustrated in FIG. 1B. Among other things, the manual interface 125 may enable the user to change the position of the measuring device 18 or base 12/rotary table 14 (e.g., with respect to one another), and to record data relating to the position of the measuring device 18 or base 12/rotary table 14. To that end, the manual user interface 125 may have control buttons 125A and joysticks or knobs 125B that allow a user to manually operate the CMM 10. The interface 125 also may have a display window 125C (e.g., a liquid crystal display) for showing system positions, and programming certain functions and positions of the measuring device 18 or base 12. Of course, the manual interface 125 may have a number of other components and thus, the components 125A-125C shown in this drawing are for illustrative purposes only.

In a moving table CMM 10, for example, the measuring device 18 may also be movable via control buttons 125A. As such, the movable features 16 may respond to manual control, or be under control of an internal computer processor, to move the base 12 and/or the measuring device 18 (e.g., a mechanical probe or a laser probe in a mechanical CMM 10) relative to one another. Accordingly, this arrangement permits the object 11 being measured to be presented to the measuring device 18 from a variety of angles, and in a variety of positions.

Figure 2:
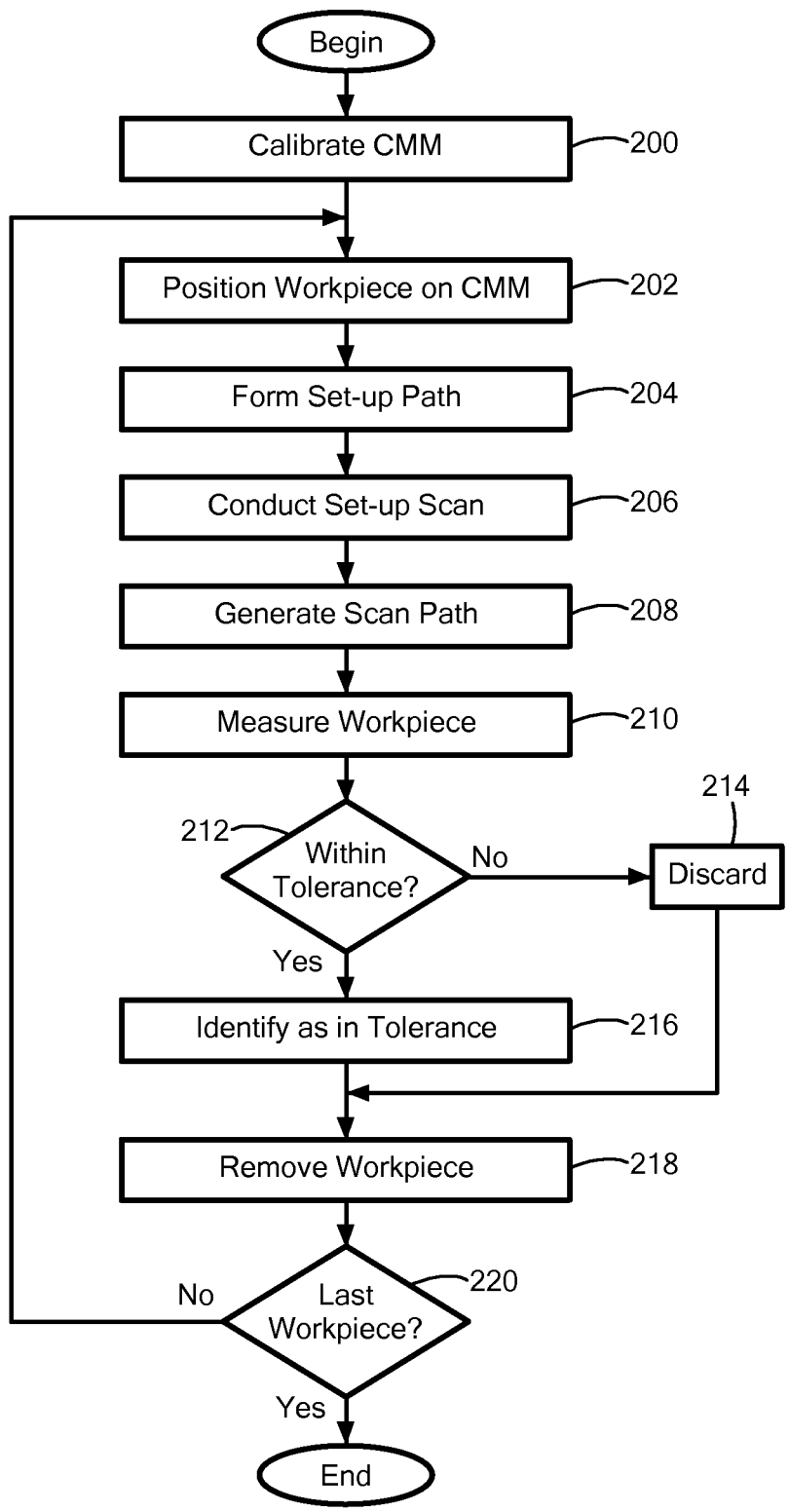
FIG. 2 shows a process of measuring a physical object in accordance with illustrative embodiments of the invention.

FIG. 2 shows a process of measuring the object 11 in accordance with illustrative embodiments of the invention. It should be noted that this process may be, in some instances, a substantially simplified from a longer process of measuring an object 11. Accordingly, the process of measuring an object 11 typically has other steps that those skilled in the art likely also would use. In addition, some of the steps may be performed in a different order than that shown, or at the same time. Those skilled in the art therefore can modify the process as appropriate.

It also should be noted that reference to an operator performing certain steps is but one of a number of different options. Some embodiments may use a logic device or automated robot to perform some of the steps. Accordingly, discussion of an operator is not intended to limit various embodiments.

This process preferably is repeated many times for a plurality of different objects 11 manufactured to the same specifications. For example, this process may be used to measure hundreds of jet engine blades that nominally are identically manufactured.

The process of FIG. 2 begins at step 200, in which an operator calibrates the CMM 10. More particularly, to accurately measure the object 11, the CMM 10 should have data relating to the actual orientation and position of the rotary table 14 relative to the other components of the CMM 10. As such, the system gathers data relating to the vector and position of the axis about which the rotary table 14 rotates.

To that end, an operator first may position a substantially straight shaft at the nominal center of the rotary table 14. Next, the operator may rotate the shaft in pre-specified increments, such 90 degree increments, and measure the orientation and location of the shaft at each increment. Using well-known CMM calibration routines, this process should enable the CMM 10 to gather data about the actual orientation and location of the rotary table 14. In other words, this initial calibration process provides the frame of reference of the rotary table 14 to the system.

After calibrating the CMM 10, the operator positions the object 11 on the rotary table 14 (step 202). At this stage of the process, this object 11 just positioned on the rotary table 14 is the first of a series of nominally identical objects 11 to be measured by the CMM 10. Of course, some embodiments may measure just one object 11, or objects 11 manufactured to different design specifications.

The process then continues to step 204, which begins forming/producing an initial path for performing a first scan of the object 11 on the rotary table 14. More specifically, as known by those skilled in the art, the object 11 preferably was manufactured based on a set of nominal requirements/ specifications identifying its ideal structure. For example, the set of nominal requirements may include geometry information, such as the flatness or waviness of the surface, the size of the object 11, the size and shape of certain features of the object 11, the distances between certain features of the object 11, the orientation of certain features relative to other features of the object 11, etc. This set of nominal specifications and/or geometry typically is stored in a computer-aided design file (a "CAD" file) in memory of the CMM 10 (e.g., in memory in the control system 22).

A jet engine blade is a good example of an object 11 that may benefit from illustrative embodiments. As known by those in the art, a jet engine blade has two large, opposed surfaces, and two very thin edges between the two large opposed surfaces. As known by those skilled in the art, the two opposed surfaces often have complex contours and geometries that, despite state-of-the-art manufacturing techniques, often widely vary from the nominal requirements. Such objects 11 therefore often have relatively large deviations from the nominal. Accordingly, prior art CMM systems often cannot rely on their internal CAD files to accurately map out a concise and accurate path for its probe 18A to follow during the measurement scan. Instead, such prior art CMM systems simply moved their probes very slowly so that they could generate an appropriate scan path on-the-fly; i.e., during the measurement scan itself. Consequently, the process of measuring a complex object 11, such as a jet engine blade, can last a significant amount of time compared to the actual process of making the jet engine blade.

The inventors recognize this problem and, contrary to conventional thinking, discover that they could substantially improve the measurement speed by, in some instances, doubling the number of scans of the object 11—i.e., they now will scan the object twice instead of once. The first scan simply gathers data to form an appropriate, finely tuned scan path that the probe 18A subsequently uses to measure the object 11 in the second noted scan (the "measurement scan"). While two scans on their face may appear to take longer, the inventors discovered that both scans could be done quite rapidly and together take less time than a single prior art measurement scan.

To that end, the prior mentioned step 204 forms a first/ initial scan path, referred to as a "set-up path," that the probe 18A follows for its first scan of the object 11. More specifically, the control system 22 forms the set-up path by using the nominal model data in the CAD file, as well as calibration information identifying the position of the rotary table 14 and other parts of the CMM 10. Because it is based upon nominal information, the set-up path likely will periodically move the object 11 in and out of the focal plane (i.e., beyond the focal length) of the probe 18A during probe travel. Despite that, the set-up path should be accurate enough for the probe 18A to have a first accuracy that is sufficient for its intended function. In other words, although this first accuracy may not be sufficient to appropriately measure the object 11, it should be sufficient to gather data to ultimately form the actual scan path that will be used to measure the object 11.

Figure 3A:
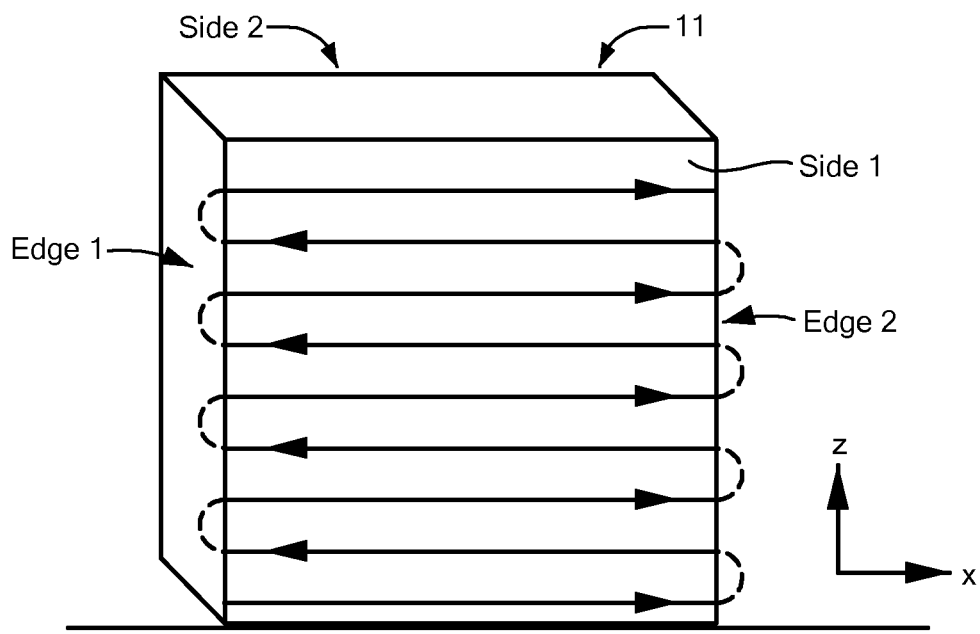
FIG. 3A schematically shows the path the CMM takes in forming a part of its scan path of its probe on a sample object in accordance with illustrative embodiments of the invention. This portion forms the scan path across a first side of the object.
Figure 3B:
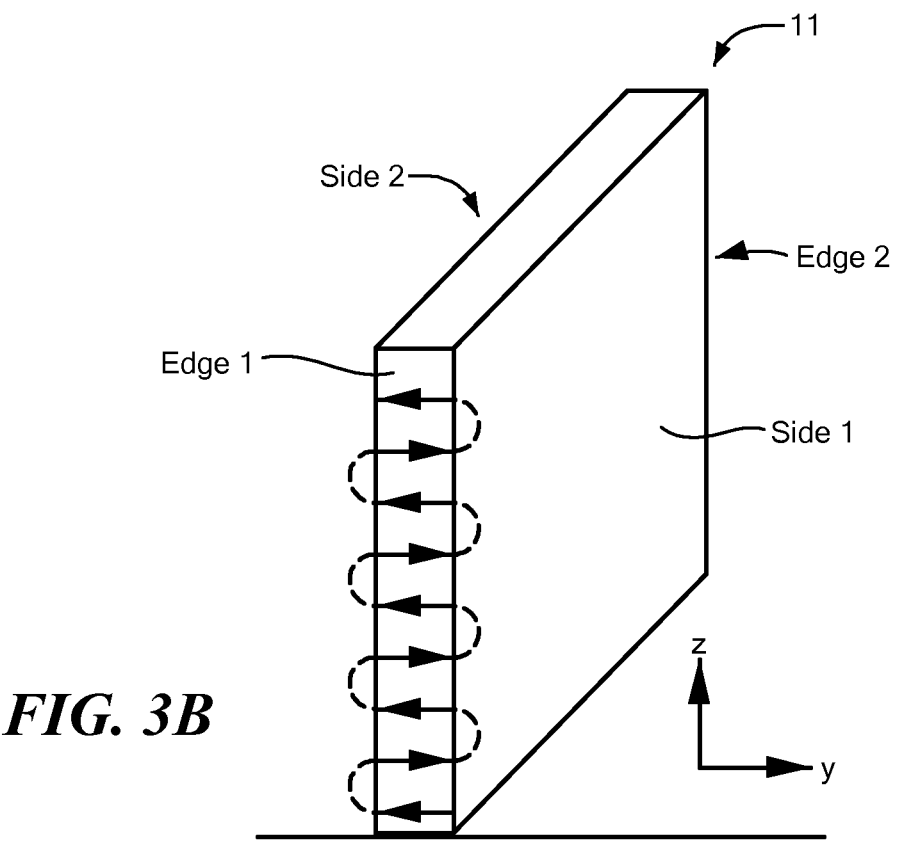
FIG. 3B schematically shows the path the CMM takes in forming a part of its scan path of its probe on the sample object of FIG. 3A in accordance with illustrative embodiments of the invention. This portion forms the scan path across a first edge of the object.

The set-up path can take any of a variety of forms—it depends on the features of interest of the object 11. For example, FIGS. 3A and 3B schematically show an example of a set-up path used for a cube having first and second sides that each have large areas (Side 1 and Side 2 in the figures), and first and second edges that each have much smaller areas (Edge 1 and Edge 2 in the figures). FIG. 3A shows the set-up path of Side 1, in which the probe 18A is to move in the X direction from Edge 1 to Edge 2 along the surface of Side 1. The solid lines indicate locations where the probe 18A should measure the object 11, while the dashed lines indicate locations where the probe 18A will not measure the object 11. In other words, the set-up path follows a serpentine trajectory from the bottom of Side 1 up to the top of Side 1. FIG. 3B schematically shows the serpentine shape of the setup path along Edge 1. In this example, the setup path will have similar serpentine shaped orientations along Side 2 and Edge 2. Of course, it should be reiterated that a serpentine path or other discussed path is merely exemplary and not intended to limit all embodiments of the invention. Those skilled in the art thus may form setup paths having vastly different trajectories.

Accordingly, after forming the set-up path, the process continues to step 206, which initiates and completes the above noted first scan—referred to as a "set-up scan" or a "set-up measurement." To that end, the probe 18A moves along the set-up path, gathering actual data relating to the object 11. Among other things, this data may include actual geometry data, length data, and similar information relating to the object 11.

Some embodiments use multiple probes 18A that each has a different focal length and/or direction. Accordingly, based upon the nominal data, some embodiments alternate measurements between probes 18A depending upon the details of the object 11. Moreover, illustrative embodiments also strive to orient the probe(s) 18A so that the respective light beam is substantially perpendicular to the surface of the object 11. This can be particularly challenging when the surface of the object 11 has complex geometry and convolutions. As noted above, however, during this first scan, the probe(s) 18A may move beyond their respective focal planes. As such, this information may have some inaccuracies that are within the tolerances for the process.

Continuing with the examples of FIGS. 3A and 3B, to perform the set-up measurement, the probe 18A completes the following sequential steps:
  scans along Side 1,
  rotates the rotary table 14 to scan Edge 1,
  rotates the rotary table 14 to scan Side 2, and
  rotates the rotary table 14 to scan Edge 2.

As shown and noted above, the CMM 10 only scans while facing the object 11. It preferably does not scan when it travels beyond the edge of the object 11. It also should be noted that the setup path of FIGS. 3A and 3B are shown as being substantially continuous across each of the surfaces of the object 11. Some objects 11, however, may have discontinuities, such as holes or deep recesses, that may alter the continuity of the setup path. Accordingly, in that case, the probe 18A may follow the setup path, but stop gathering data when it reaches those discontinuities or other similar portions of the object 11. Illustrative embodiments, however, may continue to gather data at a discontinuity despite the potential inaccuracies at that location.

The process continues to step 208, which generates the scan path for the second scan (i.e., the scan that measures the object 11) based on the information gathered by the first scan. To illustrate this, FIG. 4 pictorially shows how the control system 22 in the CMM 10 combines data gathered during a first set-up scan into a final scan path in accordance with illustrative embodiments of the invention. Specifically, as noted, the control system 22 formulates the scan path based upon the scan path information retrieved during the first scan. This information may be generated after the first scan is fully completed, or as the first scan generates the data.

As shown in FIG. 4, the probe 18A in this example made nine generally straight passes along each of the four surfaces it measured. Based upon data gathered during each pass, the control system 22 generates actual path data, which is shown in the first four columns. Specifically, the column with the heading "Side 1" shows nine unconnected, measured paths that are generated based upon the scan path information of the first scan/set-up measurement.

The data in each of of these unconnected paths are used as inputs into a process that produces the final scan path (the column on the right side with the heading "Scan Path." To that end, in some embodiments, this process may collect the data from these four segments and calculate a smooth, continuous scan path through them representative of the actual blade geometry. This may include, among other things, trimming and splicing these measured segments together to form a rough representation of the blade section, calculating a smooth curve through this representation, and then further smoothing the vectors. The rotary table angles are calculated based on those vectors.

Accordingly, as discussed below, the CMM 10 may be programmed to scan at some or all points in its scan path. In this example, each scan path is continuous and thus, provides for a full revolution around the object 11. In some cases, it may not provide a full revolution. Despite that, each scan path is effectively disconnected from, or discontinuous with, other scan paths. Specifically, the "Scan Path" column shows the nine scan paths the CMM 10 will use in this example. The first and last scan path each have just one adjacent, unconnected scan path, while all the other scan paths each have two adjacent, unconnected scan paths.

After generating the scan path, the control system 22 measures the object 11 (step 210). To that end, the control system 22 directs the probe 18A along the calculated scan path(s) to determine the actual measurements of prescribed portions of the object 11. As noted, regardless of whether the object 11 has a discontinuity, the CMM 10 may measure some or all of each scan path. This measurement has a second accuracy that preferably is better than the accuracy of the first scan (referred to above as the "first accuracy"). In other words, the object data acquired by the second scan preferably is more correct or better than the object data produced by the first scan. As such, this measurement may be referred to as a "fine measurement" of the object 11.

Using the example of FIG. 4, the control system 22 thus causes the object 11 to make nine separate revolutions relative to the probe 18A. Some or all of the measurements may simply measure along one dimension in a given revolution, such as the distance between two points. After completing one revolution, the probe 18A moves in a prescribed manner, such as along the z-axis, to another scan path to make another revolution around the object 11. When moving to the next scan path, the probe 18A preferably makes no measurements. Some embodiments, however, may measure between revolutions.

Each scan revolution may be considered to form a plane that is perpendicular to the z-axis. Other embodiments, however, may move along scan paths around the z-axis in a different manner, such as scan paths forming planes that are not normal to the z-axis. As another example, some embodiments simply may form scan paths that are irregularly shaped.

When measuring the object 11 along the scan paths, the probe 18A preferably is positioned such that its light beam is substantially perpendicular to the surface of the object 11, which may have a wavy or otherwise convoluted surface. In that case, the arm 20 and/or probe 18A may have a wrist, mirror, waveguide, rotary table 14, or other mechanism that appropriately adjusts the orientation of the probe 18A relative to the object 11. This orientation information also may be derived from the measurement information of the first scan.

Step 210 therefore produces a plurality of measurement values that are compared to the nominal measurements and their permitted tolerances. For example, the distance between two prescribed features on Side 1 of the object 11 may nominally be 15 millimeters with a tolerance of 0.5 millimeters. Accordingly, step 212 determines if the measurements of the object 11 are within tolerances specified by the CAD file. Continuing of the immediately prior example, if the distance between the two noted features is 15.6 millimeters, then the object 11 is outside of the permitted tolerances. In that case, step 214 discards the object 11 or otherwise identifies it as exceeding specified tolerances. Conversely, if the object 11 is within specified tolerances (e.g., 15.18 millimeters between the two noted features), then the process identifies the object 11 as being within specified tolerances (step 216).

Next, if not discarded, the process removes the object 11 from the rotary table 14 (the process may place the object in an appropriately marked box, step 218), and then determines if the removed object 11 is the last object 11 to be measured (step 220). As noted above, this process preferably is repeated for a plurality of nominally identical work pieces. For example, this process may be performed at the end of a manufacturing line for nominally identical jet engine blades. If there are additional objects 11 to be measured, then the process loops back to step 202 to position the new object 11 on the rotary table 14. This loop thus concludes when the process has measured all of the work pieces.

Accordingly, rather than making a single scan, illustrative embodiments add another scan to the overall manufacturing process, which many skilled in the art may consider to be redundant. Despite that apparent redundancy, the inventors were surprised to discover that the total time required to make both scans often was significantly less than the total time for the prior art single scan—and both typically returned comparably reliable measurement values. Illustrative embodiments of the discussed process and apparatus thus favorably improve manufacturing throughput for complex objects 11 (and less complex objects 11), permitting more objects 11 to be measured for a given time.

It should be noted that some embodiments apply to CMMs 10 that do not use one or more non-contact probes (e.g., using light or laser beams to measure the object 11). For example, the CMM 10 may use one or more contact probes or a camera in a corresponding manner. In fact, rather than scanning the actual object 11, some embodiments may first form a point cloud of the object 11 and perform some or all of the noted steps in a virtual environment (e.g., within a computer environment).

Various embodiments of the invention (e.g., the control system 22) may be implemented at least in part in any conventional computer programming language. For example, some embodiments may be implemented in a procedural programming language (e.g., "C"), or in an object oriented programming language (e.g., "C++"). Other embodiments of the invention may be implemented as pre-configured, stand-alone hardware elements and/or as preprogrammed hardware elements (e.g., application specific integrated circuits, FPGAs, and digital signal processors), or other related components.

In an alternative embodiment, the disclosed apparatus and methods (e.g., see the various flow charts described above) may be implemented as a computer program product for use with a computer system. Such implementation may include a series of computer instructions fixed either on a tangible, non-transitory medium, such as a computer readable medium (e.g., a diskette, CD-ROM, ROM, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical, electrical, or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). In fact, some embodiments may be implemented in a software-as-a-service model ("SAAS") or cloud computing model. Ofcourse, some embodiments of the invention may be implemented as a combination of both software (e.g., a computer program product) and hardware. Still other embodiments of the invention are implemented as entirely hardware, or entirely software.

Although the above discussion discloses various exemplary embodiments of the invention, it should be apparent that those skilled in the art can make various modifications that will achieve some of the advantages of the invention without departing from the true scope of the invention.

What is claimed is:

1. A method of measuring a workpiece using a CMM, the method comprising:
   receiving idealized geometric data from a computer representation of the workpiece, wherein the idealized geometric data is a representation of the manufacturing specifications of the workpiece;
   calculating a first scan path using the idealized geometric data;
   conducting a first coarser scan of the workpiece along the first scan path using a CMM probe, the first scan producing measured workpiece geometric information;
   calculating a second scan path of the workpiece using the measured workpiece geometric information from the first coarser scan; and
   conducting a second finer scan of the workpiece along the second scan path using the CMM probe, the second finer scan producing fine measurement information,
   the first coarser scan beginning before the second finer scan begins.

2. The method as defined by claim 1 wherein the CMM probe comprises a non-contact probe having a focal length.

3. The method as defined by claim 2 wherein the first scan path directs the CMM probe along the workpiece, the CMM probe moving beyond its focal length at least once when it moves along the workpiece following the first scan path.

4. The method as defined by claim 1 wherein the CMM probe comprises a contact probe.

5. The method as defined by claim 1 wherein the second scan path includes at least one revolution around the workpiece.

6. The method as defined by claim 5 wherein the second scan path includes a plurality of revolutions around the workpiece, the CMM probe conducting at least one fine measurement of the workpiece during each revolution, the CMM probe moving between at least two adjacent revolutions of the second scan path without the CMM probe conducting a fine measurement of the workpiece between the two adjacent revolutions.

7. The method as defined by claim 1 wherein the second scan path comprises a plurality of revolutions around the workpiece, the CMM probe not conducting a fine measurement between adjacent revolutions.

8. The method as defined by claim 1 wherein the first coarser scan has a first accuracy, and the second finer scan has a second accuracy that is more accurate than the first accuracy.

9. The method as defined by claim 1 wherein the workpiece has a surface, the CMM probe generating a light beam having a longitudinal axis, the scan path orienting the CMM probe so that the longitudinal axis of the light beam is normal to the surface of the workpiece during a majority of the second scan path.

10. The method as defined by claim 1 wherein the second finer scan comprises a one-dimensional measurement along at least a portion of the workpiece..

11. The method as defined by claim 1 wherein the second finer scan begins prior to the completion of the first coarser scan.

12. A CMM comprising:
a base configured to support an object;
a CMM probe;
a control system operatively coupled with the CMM probe, the control system being configured to cause the CMM probe to conduct a geometric coarse measurement of the workpiece, the CMM probe conducting the coarse measurement by following a first scan path that is based on idealized geometric data of the workpiece, the coarse measurement of the workpiece producing scan path information, the control system further being configured to generate a second scan path using the scan path information and control the CMM probe to conduct a measurement of the workpiece by causing the CMM probe to move along the generated second scan path, wherein the idealized geometric data is a representation of the manufacturing specifications of the workpiece.

13. The CMM as defined by claim 12 further comprising a rotary table for supporting and orient the object.

14. The CMM as defined by claim 12 wherein the CMM probe comprises a non-contact probe having a focal length.

15. The CMM as defined by claim 14 wherein the first scan path directs the CMM probe along the workpiece, the CMM probe configured to move beyond its focal length at least once when it moves along the workpiece following the first scan path.

16. The CMM as defined by claim 12 wherein the second scan path includes at least one revolution around the object.

17. The CMM as defined by claim 16 wherein the second scan path includes a plurality of revolutions around the workpiece, the control system configured to cause the CMM probe to conduct at least one fine measurement of the workpiece during each revolution, the control system configured to move the CMM probe between at least two adjacent revolutions of the second scan path without the CMM probe conducting at least one fine measurement of the workpiece.

18. The CMM as defined by claim 12 wherein the second scan path includes less than one revolution around the object.

19. The CMM as defined by claim 12 further comprising memory storing a CAD model of the object, the CAD model comprising the nominal geometry data of the object.

20. A computer program product for use on a computer system for measuring a workpiece using a CMM, the computer program product comprising a tangible, non-transient computer usable medium having computer readable program code thereon, the computer readable program code comprising:
program code for receiving idealized geometric data from a computer representation of the workpiece, wherein the idealized geometric data is a representation of the manufacturing specifications of the workpiece;
program code for producing a coarser set-up path based on the received idealized geometric data;
program code for conducting a geometric set-up measurement of the workpiece using a CMM probe by following the coarser set-up path, the set-up measurement of the workpiece producing scan path information;
program code for generating a finer scan path using the scan path information from the set-up measurement; and
program code for controlling the CMM probe to conduct a fine measurement of the workpiece by causing the CMM probe to move along the generated finer scan path.

21. The computer program product as defined by claim 20 wherein the CMM probe comprises a non-contact probe having a focal length.

22. The computer program product as defined by claim 21 wherein the coarser set-up path directs the CMM probe along the workpiece, the CMM probe having a focal length, the CMM probe moving beyond its focal length at least once when it moves along the coarser set-up path.

23. The computer program product as defined by claim 20 wherein the finer scan path includes a plurality of revolutions around the workpiece, the program code for controlling having program code for causing the CMM probe to conduct at least one fine measurement of the object during each revolution and causing the CMM probe to move between at least two adjacent revolutions of the finer scan path without the CMM probe conducting at least one fine measurement of the workpiece.

* * * * *

UNITED STATES PATENT AND TRADEMARK OFFICE
CERTIFICATE OF CORRECTION

| | | |
|---|---|---|
| PATENT NO. | : 10,545,019 B2 | Page 1 of 1 |
| APPLICATION NO. | : 14/685780 | |
| DATED | : January 28, 2020 | |
| INVENTOR(S) | : Paul Racine et al. | |

It is certified that error appears in the above-identified patent and that said Letters Patent is hereby corrected as shown below:

In the Claims

At Column 11, Claim 10, Line number 3, please delete the second full stop ".".

At Column 11, Claim 12, Line number 2, please replace "an object" with --a workpiece--

At Column 11, Claim 13, Line number 2, please replace "object" with --workpiece--

At Column 11, Claim 16, Line number 2, please replace "object" with --workpiece--

At Column 12, Claim 18, Line number 3, please replace "object" with --workpiece--

At Column 12, Claim 19, Line number 2, please replace "object" with --workpiece--

At Column 12, Claim 19, Line number 3, please replace "object" with --workpiece--

At Column 12, Claim 23, Line number 5, please replace "object" with --workpiece--

Signed and Sealed this
Thirty-first Day of March, 2020

Andrei Iancu
*Director of the United States Patent and Trademark Office*